United States Patent [19]

Kawata et al.

[11] Patent Number: 5,469,931
[45] Date of Patent: Nov. 28, 1995

[54] PROPELLER SHAFT ARRANGEMENT

[75] Inventors: Yutaka Kawata, Ebina; Yoichi Ebe, Tokyo; Harumichi Hino; Hidenobu Kawai, both of Shizuoka, all of Japan

[73] Assignee: Jidosha Buhin Kogyo Co., Ltd., Kanagwa, Japan

[21] Appl. No.: 159,091

[22] Filed: Nov. 29, 1993

[30] Foreign Application Priority Data

Nov. 30, 1992 [JP] Japan ................... 4-320730

[51] Int. Cl.⁶ .................. B60K 17/22; B60K 17/24; F16D 1/033
[52] U.S. Cl. .................. 180/379; 180/383; 464/182; 464/183; 464/902; 464/117; 464/157; 403/342
[58] Field of Search .................. 180/383, 384, 180/379, 377, 376; 464/117, 114, 113, 182, 183, 157, 902; 403/342, 343, 341

[56] References Cited

U.S. PATENT DOCUMENTS

| | | | |
|---|---|---|---|
| 1,261,105 | 4/1918 | Craft | 180/379 |
| 2,415,893 | 2/1947 | Lamb | 464/182 |
| 2,815,231 | 12/1957 | Wilson | 403/342 |
| 2,839,902 | 6/1958 | Glover | 464/157 |
| 2,909,233 | 10/1959 | Kozub | 180/384 |
| 4,053,248 | 10/1977 | Schultenkamper et al. | 424/113 |
| 4,421,497 | 12/1983 | Federmann et al. | 464/183 |
| 4,460,058 | 7/1984 | Welschof et al. | 180/258 |
| 4,527,978 | 7/1985 | Zackrisson | 464/182 |
| 4,747,806 | 5/1988 | Krude et al. | 464/182 |
| 4,778,026 | 10/1988 | Uchida et al. | 180/384 |
| 4,792,320 | 12/1988 | Nickel | 464/183 |

FOREIGN PATENT DOCUMENTS

| | | |
|---|---|---|
| 366157 | 3/1982 | Austria . |
| 491221 | 6/1992 | European Pat. Off. . |
| 2429687 | 1/1980 | France ................ 180/383 |
| 2851293 | 5/1979 | Germany ............ 180/379 |
| 3128619 | 4/1982 | Germany . |
| 4079423 | 3/1989 | Japan ................ 464/182 |
| 0662471 | 12/1951 | United Kingdom .... 403/342 |
| 2160620 | 12/1985 | United Kingdom . |

*Primary Examiner*—Margaret A. Focarino
*Assistant Examiner*—Peter C. English
*Attorney, Agent, or Firm*—Thomas K. Ziegler

[57] ABSTRACT

The propeller shaft arrangement which connects a transmission with a differential gear of a vehicle includes a first propeller shaft segment connected to the transmission at one end thereof and a second propeller shaft segment connected to the differential gear at one end thereof. The first and second propeller shaft segments are made of aluminum. The other end of the second propeller shaft segment is connected with one end of a steel center bearing via art universal joint. Serrations are formed at the other end of the center bearing and at the other end of the first propeller shaft segment such that the serrations of the center bearing are engaged with those of the first propeller shaft segment and a locking nut is screwed down over the engaging serrations to join the first propeller shaft segment with the center bearing. Since the center bearing is made of steel whereas most of the propeller shaft is made of aluminum, the weight of the propeller shaft is reduced while ensuring sufficient strength of the center bearing. Further, the first propeller shaft segment is connected with the center bearing by the serrations and the locking nut. Therefore, welding the aluminum shaft with the steel bearing, which is technically difficult to perform, is not necessary.

13 Claims, 4 Drawing Sheets

PROPELLER SHAFT ARRANGEMENT

BACKGROUND OF THE INVENTION

1. Technical Field

This invention relates to a propeller shaft arrangement connecting a transmission and a differential gear of an automobile, and more particularly to a propeller shaft arrangement, most of which is made of aluminum.

2. Background Art

A propeller shaft for an automobile is generally made of steel and connects a transmission with a differential gear. Generally, the propeller shaft has a universal joint since the vibration system on the transmission side and that on the differential gear side differ from each other. If a universal joint is provided, the propeller shaft is divided into two segments and these two segments are supported by a center bearing mounted on the vehicle body.

Recently, there has been a demand to reduce weight of the propeller shaft and experiments have been made using aluminum-made propeller shafts.

However, since aluminum is weaker than steel, the diameter of the propeller shaft must be increased to insure sufficient strength. A larger center bearing is required to support a propeller shaft having a larger diameter. Further, circumferential speed of the propeller shaft is raised as its diameter becomes greater. The center bearing (ball bearing) may not be able to cope with such increased circumferential speed. In addition, an oil seal which protects the center bearing from dust and water may not function appropriately if a large center bearing is employed. In this case, the center bearing and the aluminum propeller shaft may contact each other directly and abrasion is accelerated.

SUMMARY OF THE INVENTION

An object of the present invention is to provide a propeller shaft arrangement, most of which is made from aluminum and which does not cause any problems concerning center bearings.

According to one aspect of the present invention, there is provided a propeller shaft arrangement for use in connecting a transmission with a differential gear of a vehicle, comprising a first propeller shaft segment connected to the transmission, a second propeller shaft segment connected to the differential gear, the first and second propeller shaft segments being made of aluminum or aluminum alloy, a steel shaft connecting the first propeller shaft segment with the second propeller shaft segment and ball bearing means mounted on a vehicle frame for rotatably supporting the steel shaft.

According to another aspect of the present invention, there is provided a propeller shaft arrangement for a vehicle, characterized in that the propeller shaft includes a first propeller shaft segment connected to the transmission at one end thereof and a second propeller shaft segment connected to the differential gear at one end thereof, the first and second propeller shaft segments being made of aluminum or aluminum alloy, the other end of the second propeller shaft segment being connected with one end of a steel-made center bearing via a universal joint, and wherein serrations are formed at the other end of the center bearing and at the other end of the first propeller shaft segment such that the serrations of the center bearing are engaged with those of the first propeller shaft segment and a locking nut is screwed down over the engaging serrations to join the first propeller shaft segment with the center bearing.

According to the present invention, the center bearing is made of steel whereas most of the propeller shaft arrangement is made of aluminum or aluminum alloy. Therefore, the weight of the propeller shaft arrangement is reduced while ensuring sufficient strength of the center bearing. Further, the first propeller shaft segment is connected with the center bearing with the serrations and the locking nut. Therefore, welding the aluminum shaft onto the steel bearing, which is technically difficult to perform, is not necessary.

DESCRIPTION OF THE PREFERRED EMBODIMENTS

Now, a preferred embodiment of the present invention will be described with reference to the accompanying drawings.

Figure 1:
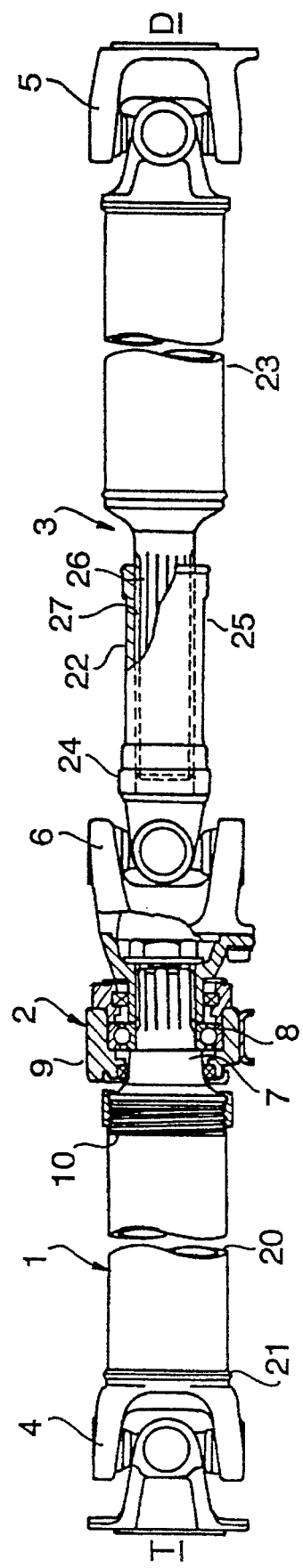
FIG. 1 illustrates a propeller shaft arrangement according to an embodiment of this invention.

Referring first to FIG. 1, a propeller shaft arrangement includes a first propeller shaft segment 1 which is connected with a transmission T, a center bearing 2 supported by a vehicle frame (not shown) and a second propeller shaft segment 3 connected with a differential gear D. The first and second propeller shaft segments are made of aluminum or aluminum alloy and the center bearing 2 is made of steel.

Each propeller shaft segment includes a pipe portion and an universal joint. Specifically, the first propeller shaft segment 1 has a first universal joint 4 for connection with the transmission T and the second propeller shaft segment 2 has a second universal joint 5 for connection with the differential gear D. The pipe portion of each propeller shaft segment made from a combination of 6061 aluminum alloy and ceramic particle (e.g., alumina particle). The alumina particle occupies 20% in volume. The pipe portion has a general diameter of 101.6 mm and a thickness of 3 mm. Aging treatment is applied to the pipe portion to improve its strength. The universal joint is made from 6000 aluminum alloy or its family. For example, employed is an HS60 alloy whose Mg, Si and Cu contents are appropriately adjusted.

The first pipe portion 20 of the first propeller shaft segment 1 is provided with the universal joint 4 at one end thereof for connection with the transmission T. The universal joint 4 is made from aluminum alloy (HS60 alloy) and welded on the pipe portion 20 at its root portion 21. A connecting element 10 made from aluminum alloy (HS60 alloy) is welded on the other end of the pope portion 20 to close the other end of the pipe portion 20 and to connect the pipe portion 20 with a steel shaft 7 of the center bearing 2.

The second propeller shaft segment 3 has an intermediate universal joint 6 at one end thereof for mechanical connection with the shaft 7 of the center bearing 2 and an universal joint 5 at the other end thereof for connection with the differential gear D. The second propeller shaft segment 3 includes a second pipe portion 23 made from 6061 aluminum alloy and a slide shaft 22. The slide shaft 22 is provided to adjust the shaft length. The slide shaft 22 is welded onto a root 24 of the intermediate universal joint 6. This shaft 22 includes a spline tube 25 having a spline groove inside and a spline shaft 26. The spline shaft 26 engages the spline tube 25 so that it can move in the axial direction of the spline tube 25. The spline tube 25 is made from 6061 aluminum alloy and the spline shaft 26 is made from HS60 alloy. The spline shaft 26 is welded to the hollow pipe portion 23.

The spline shaft 26 is provided with a plastic resin coating 27 on its periphery (outer face) such as nylon. Burning or seizure between the spline shaft 26 and the spline tube 25 is prevented by the plastic resin coating 27.

The coating layer 27 is made by the following process: the spline shaft 26 undergoes solution heat treatment and aging treatment (T6 treatment). Immediately after the aging treatment, a resin powder is painted on the spline shaft 26 in accordance with a fluid dipping method to harden it. This process provides a resin coating without reheating since the coating layer 27 is formed taking advantage of calorific capacity generated upon the aging treatment. Accordingly, the strength at the time of aging treatment is maintained.

Figure 2:
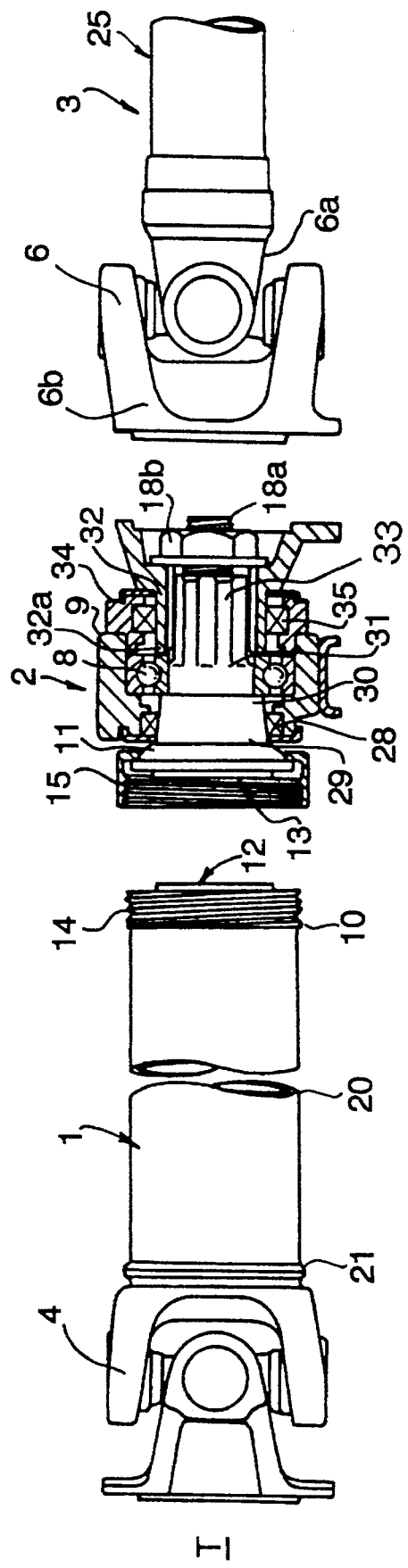
FIG. 2 is an enlarged view of a center bearing and peripheral components of the propeller shaft arrangement shown in FIG. 1.

Referring to FIG. 2, the center bearing 2 has the steel-made shaft 7 which transfers driving power, a ball bearing 8 which rotatably supports the shaft 7 and a housing 9 which houses the ball bearing 8. The housing 9 is mounted on the vehicle frame.

The shaft 7 has a flange-like connection 11 on its transmission side. The connection 11 has the same diameter as the connection 10 of the first propeller shaft segment 1. Behind the connection 11 (right hand in FIG. 2), a seal portion 29 is formed on the shaft 7. The seal portion 29 contacts a shaft seal 28 of the housing 9. Subsequent to the seal portion 29, a step portion 30 is formed to bear a thrust load of the ball bearing 8. The remainder of the shaft 7 is a shaft portion 31, part of which engages the ball bearing 8. Behind the ball bearing 8, a cylindrical element 32 fits over the shaft portion 31 to receive a joint portion 6b of the intermediate universal joint 6. Spline grooves 33 are formed on an outer face of the shaft portion 31 and an inner face of the cylindrical element 32 respectively so that the shaft portion 31 rotates with the joint portion 6b. Further, a bolt 18a projects from the rear face of the shaft portion 31. Thus, after the cylindrical element 32 is engaged over the shaft portion 31, a nut 18b is screwed down to fix the joint portion 6b onto the shaft 7. A front end 32a of the cylindrical element 32 co-operates with the step portion 30 of the shaft 7 to bear the thrust load of an inner, race of the ball bearing 8.

A presser or pressure plate 34 is provided on the cylindrical element 32 to close the rear end of the housing 9 and support an outer race of the ball bearing 8, and a seal 35 is provided between the presser plate 34 and the cylindrical element 32.

Figure 3:
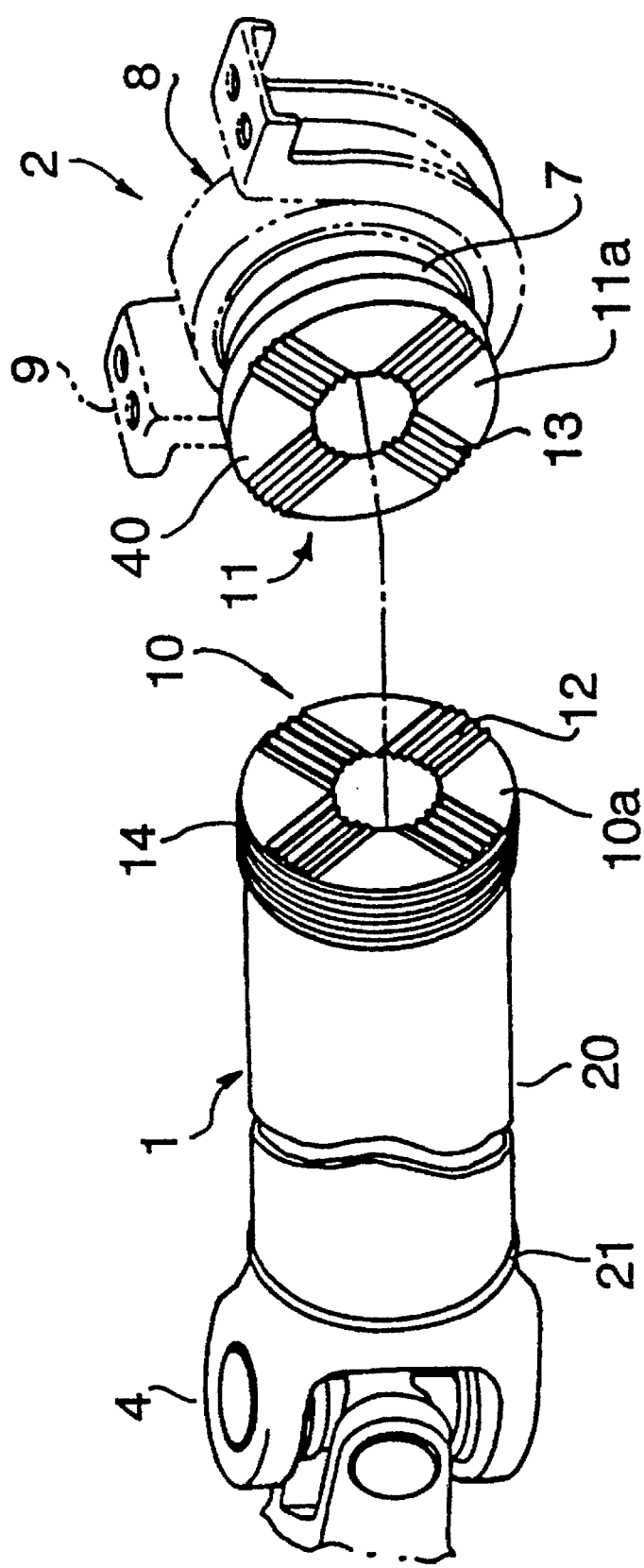
FIG. 3 is an exploded view of major parts of the propeller shaft arrangement shown in FIG. 1; and, FIGS 4(A) and 4(B) are perspective views showing the nut and jig; and, FIG. 5 is a perspective view of an alternate form of the locking nut.
Figure 4A:
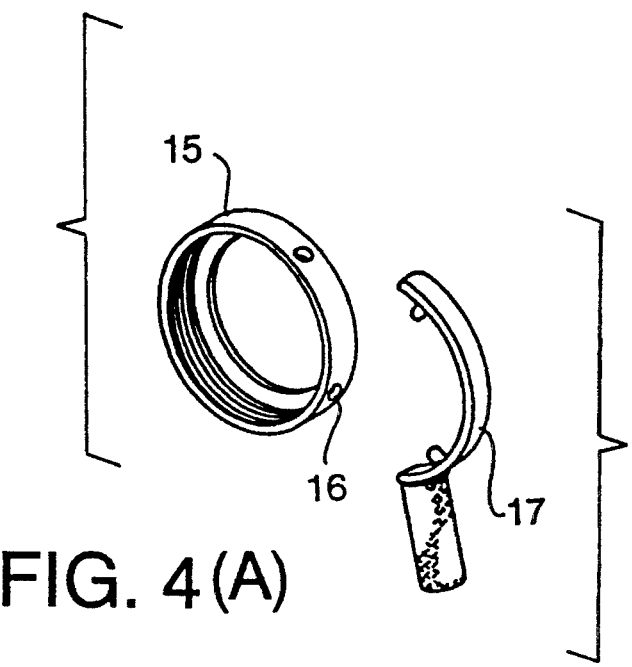
Figure 4B:
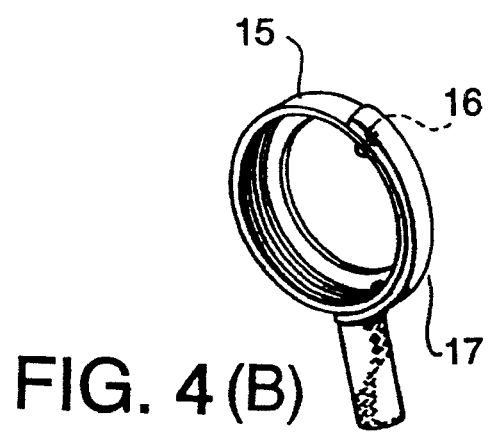
Figure 5:
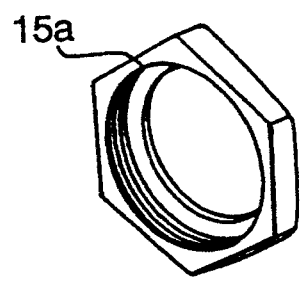

Referring now to FIG. 3, X-like serrations 12 are formed in an exposed face (contact face) 10a of the connection 10 of the first propeller shaft segment 1 and serrations 13 are formed in an exposed face (contact face) 11a of the connection 11 of the shaft 7 of the center bearing 2. Further, a thread 14 is formed on the connection 10 of the first propeller shaft segment 1 and a locking nut 15 (e.g, box nut) fits over the connection 11 of the shaft 7.

In this embodiment, the contact face 10a is made from aluminum alloy and the contact face 11a is made from steel. If water penetrates between these contact faces 10a and 11a, electric corrosion may occur due to the different metals employed. Regarding this, the connection is coated with an anode coating 40 (e.g., galvanization) at its contact face 11a in order maintain its electrical potential to the same value as the other contact face 10a. The opposite face of the connection 11 is also provided with an anode coating 40 for a similar reason.

In order to join the first propeller shaft segment 1 with the center bearing 2, the serrations 12 and 13 of the contact faces 10a and 11a are engaged with each other and the locking nut 15 is screwed over the thread 14 of the first propeller shaft segment 1. The locking nut 15 is made from aluminum alloy or coated with an anode coating. The screwing may be done with a jig 17. In such a case, openings 16 for the jig 17 are bored in the locking nut 15. Alternatively, a hexagonal locking nut 15a may be employed instead of a circular locking nut 15 and screwed down with a wrench.

Referring back to FIG. 2, the intermediate universal joint 6 which joins the center bearing 2 with the second propeller shaft segment 3 has a first joint 6a on the second propeller shaft segment 3 side and a second joint 6b on the center bearing 2 side. The first joint 6a is made of aluminum or its alloy whereas the second joint 6b is made of steel. It should be noted that the second joint 6b may be made of aluminum.

Connecting pins for the universal joints 4, 5 and 6 are made of steel.

Since the first and second propeller shaft segments 1 and 3 are made of aluminum or its alloy, their weights are reduced. Generally, 30–50% of the weight is reduced. On the other hand, the center bearing 2 is made of steel so that it is not necessary to enlarge the diameter of the shaft 7. Further, since the connection of the aluminum-made first propeller shaft segment 1 with the steel-made center bearing 2 is made by the serrations 12 and 13 and the locking nut 15, welding of aluminum and steel, which is technically difficult to perform, is unnecessary.

Since the first and second propeller shaft segments are light in weight but have relatively large diameters respectively (aluminum shaft segments inevitably have a larger diameter), variations in imbalances due to weight offsetting are small as compared with a steel-made propeller shaft. Therefore, vibrations are reduced.

The contact face 11a and its opposite face of the steel connection 11 are coated with the anode coating layer 40 and the locking nut 15 is made from aluminum alloy. Thus, even if water penetrates between the connections 10 and 11, the contact faces 10a and 11a and the locking nut 15 are maintained at the same electric potential so that the electric corrosion is prevented.

During operation, the second propeller shaft segment 3 fluctuates, with the universal joint 6 being a fulcrum, so that the second propeller shaft segment 3 changes its length. However, the length variations are adjusted or absorbed by the spline tube 25 and the spline shaft 26. The plastic coating 27 facilitates smooth length adjustment.

We claim:

1. A propeller shaft arrangement connecting a transmission with a differential gear of a vehicle, comprising:

a first propeller shaft segment connected to the transmission, the first propeller shaft segment being made of aluminum material;

a second propeller shaft segment connected to the differential gear, the second propeller shaft segment being made of aluminum material;

a shaft made of steel and drivingly connected between the first propeller shaft segment and the second propeller shaft segment; and ball bearing means mounted on a vehicle frame for rotatably supporting the steel shaft.

2. The propeller shaft arrangement of claim 1, wherein the first and second propeller shaft segments include hollow pipes made from aluminum alloy.

3. The propeller shaft arrangement of claim 2, wherein each hollow pipe is further made from a ceramic particle in combination with the aluminum alloy.

4. The propeller shaft arrangement of claim 3, wherein the first and second propeller shaft segments have universal joints pivotally connecting the segments with the transmission and the differential gear, respectively.

5. The propeller shaft arrangement of claim 1, further including mechanical connection means for connecting the first propeller shaft segment with the steel shaft.

6. The propeller shaft arrangement of claim 5, wherein the mechanical connection means includes a first connection having serrations at one end of the first propeller shaft segment, a second connection having serrations at one end of the steel shaft and locking nut means for butting and connecting the first and second connections at their serrations.

7. The propeller shaft arrangement of claim 6, wherein the locking nut means includes a box nut provided on one of the connections and a thread formed on a periphery of the other connection, the thread on the other connection threadably receiving the box nut to form a joint which joins the connections.

8. The propeller shaft arrangement of claim 6, wherein the second connection is coated with an anode coating.

9. The propeller shaft arrangement of claim 1, wherein the ball bearing means includes a housing mounted on the vehicle frame and a ball bearing received in the housing and engaging the steel shaft to rotatably support the shaft.

10. The propeller shaft arrangement of claim 1, further including an intermediate universal joint forming a pivotal connection between the steel shaft and the second propeller shaft segment.

11. The propeller shaft arrangement of claim 1, wherein the second propeller shaft segment includes a pipe element and a slide shaft portion axially slidable over one end of the pipe element for length adjustment of the second propeller shaft segment.

12. The propeller shaft arrangement of claim 11, wherein the slide shaft portion includes a spline tube connected to the steel shaft and a spline shaft fit in the spline tube and slidable in an axial direction of the spline tube, and the spline shaft is integrally connected with the pipe element.

13. The propeller shaft arrangement of claim 12, wherein the spline shaft is coated with resin coating on its periphery.

* * * * *